May 15, 1962 F. J. KAMPMEIER 3,034,408
HYDRAULICALLY ACTUATED CLAMP FOR AXIALLY ADJUSTABLE SHAFTS
Filed Aug. 26, 1960 3 Sheets-Sheet 3
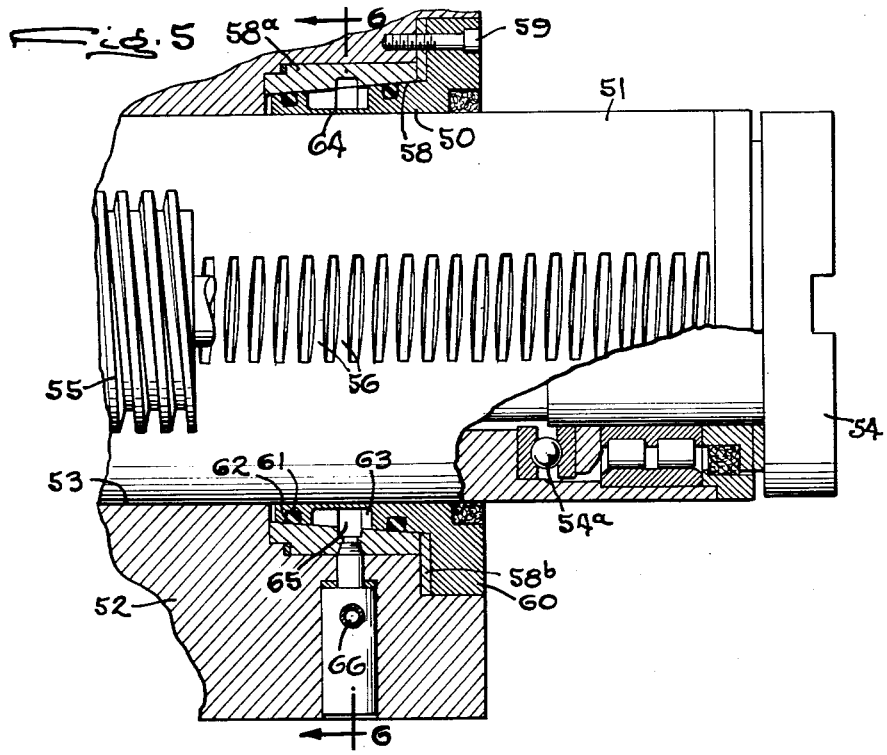
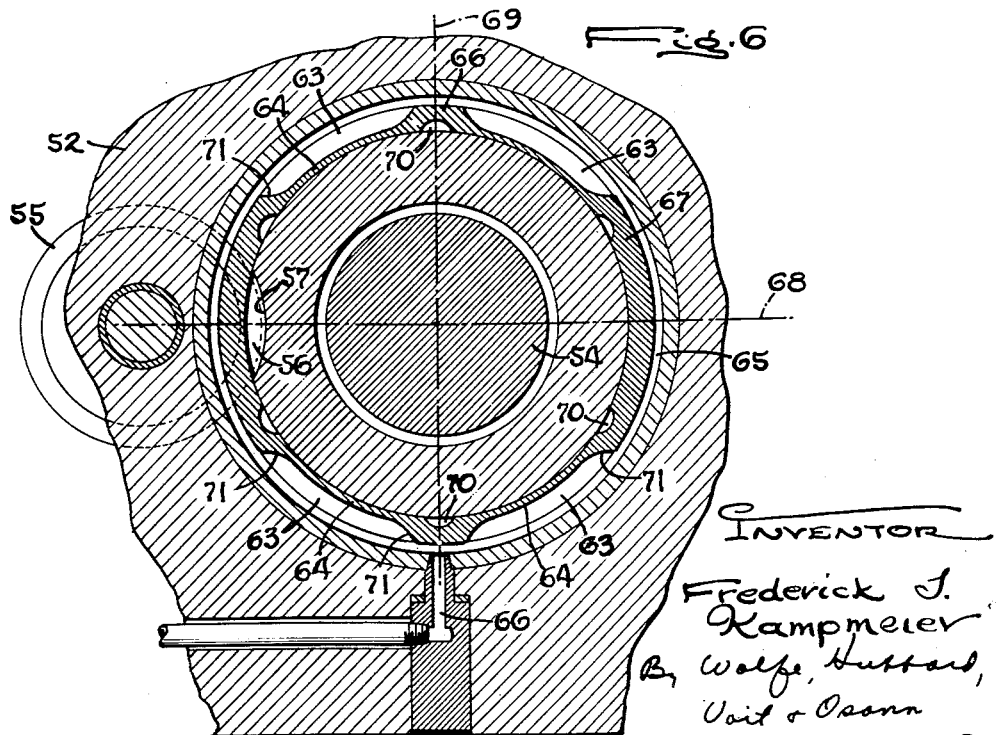
INVENTOR
Frederick J. Kampmeier
By Wolfe, Hubbard, Voit & Osann
ATTORNEYS

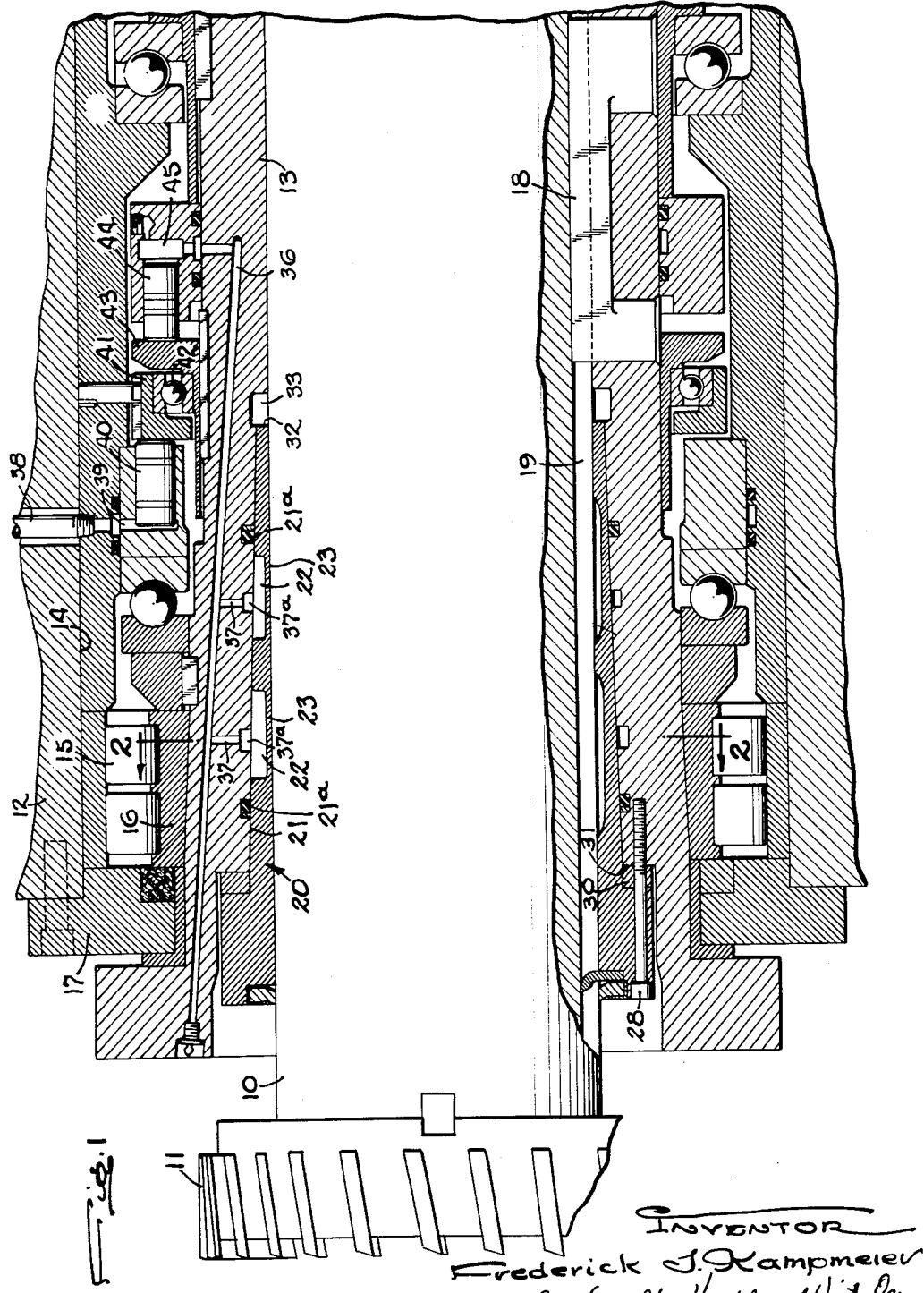

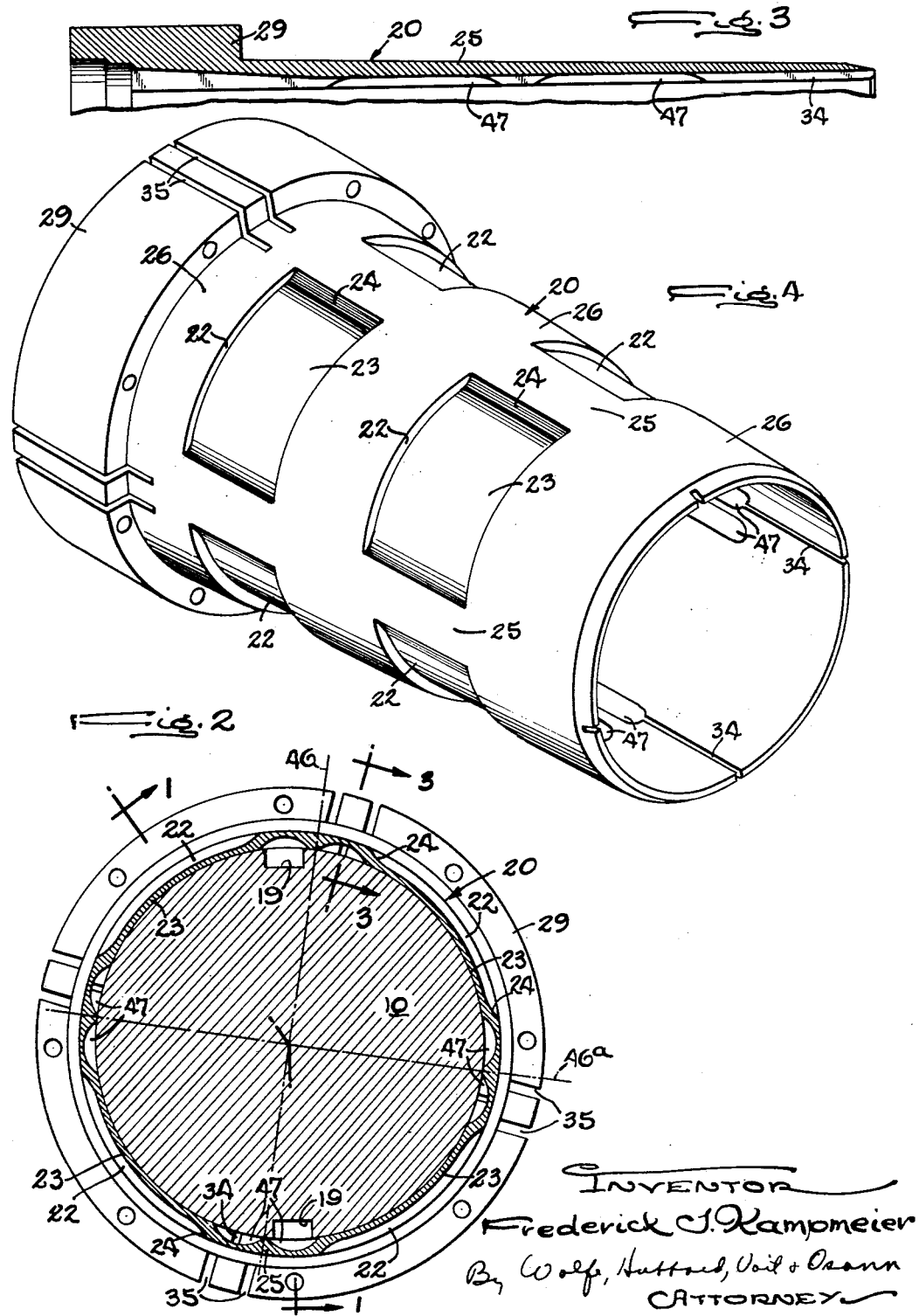

United States Patent Office 3,034,408
Patented May 15, 1962

3,034,408
HYDRAULICALLY ACTUATED CLAMP FOR AXIALLY ADJUSTABLE SHAFTS
Frederick J. Kampmeier, Rockford, Ill., assignor to The Ingersoll Milling Machine Company, Rockford, Ill., a corporation of Illinois
Filed Aug. 26, 1960, Ser. No. 52,067
10 Claims. (Cl. 90—11)

This invention relates to a hydraulically actuated friction clamping device for holding an axially slidable element in a selected position and has more particular reference to devices of the type in which the clamping action is achieved by the radial flexing of a thin walled sleeve or bushing.

One object is to provide a clamping device of the above character which effects accurate centering of the clamped element in spite of circumferential interruption of the surface of the clamped element as by a keyway A more detailed object is to achieve such accurate centering by dividing the clamping forces into a plurality of angularly spaced components distributed around the clamped element in a novel manner.

The invention also resides in the novel construction and mounting of the clamping bushing.

Other objects and advantages of the invention will become apparent from the following detailed description taken in connection with the accompanying drawings, in which FIGURE 1 is a fragmentary longitudinal section of a cutter spindle adapted to be held in different positions of axial adjustment by a clamping device embodying the novel features of the present invention, the section being taken substantially along the line 1—1 of FIG. 2.

FIG. 2 is a section taken substantially along the line 2—2 of FIG. 1.

FIG. 3 is a fragmentary section taken along the line 3—3 of FIG. 2.

FIG. 4 is a perspective view of the clamp bushing.

FIG. 5 is a sectional view similar to FIG. 1 showing a different application of the invention.

FIG. 6 is a fragmentary section taken along the line 6—6 of FIG. 5.

This application is a continuation-in-part of my copending application Serial No. 777,314 filed December 1, 1958 and now Patent No. 2,957,393.

For purposes of illustration, the improved clamp is shown in FIGS. 1 to 4 of the drawings incorporated in the mounting of a spindle 10 supporting a cutter 11 for axial adjustment relative to a tool head having a housing 12. The spindle is journaled in an elongated sleeve or quill 13 projecting into a hole 14 in the housing 12 and journaled in accurately alined bearings 15 which in this instance are mounted in a sleeve 16 held in place by a ring 17 clamped against the housing at the outer and inner ends of the hole 14. Keys 18 on the quill project into ways 19 on the spindle to couple the two together while permitting the spindle to be adjusted axially by suitable means coupled to the inner end of the spindle.

The clamp for frictionally coupling the quill to the spindle to hold the latter against axial displacement comprises a bushing 20 telescoped into and secured to the outer end of the quill and contractable around the spindle to grip the latter with the desired clamping force. To this end, the bushing is tapered longitudinally and seated in the outwardly flaring internal wall 21 of the quill and part of the metal over areas thereof spaced both angularly around and longitudinally of the bushing is cut away to provide outwardly opening recesses 22 having relatively thin bottoms 23. In this instance, the bushing has an internal diameter of about eight inches and is a casting composed of bronze.

The recesses 22 are generally rectangular and are about two inches in axial width and each extends over an arc of about seventy degrees. Herein there are two groups of four such areas axially spaced apart and disposed about midway between the ends of the bushing. Thinning of the bushing and weakening thereof at the bottoms of the recesses may be effected by a milling cutter which leaves the sides of each recess curved as indicated at 24, the bushing being about .060 of an inch thick at the bottoms of the recesses.

The recesses 22 are separated angularly by ribs 25 of substantial radial thickness and therefore rigidity, the smooth outer surfaces of these ribs merging with the surfaces of continuous rings 26 axially spaced along the bushing and defining the ends 27 of the recesses. The rib and ring surfaces are tapered to seat solidly in the quill recess 21 in which the bushing is held by an annular series of screws 28. The latter extend through a flange 29 on the outer end of the bushing and a spacer ring 30 and thread into a shoulder 31 countersunk in the quill end. The inner end 32 of the bushing terminates in a groove 33 in the quill so that the bushing is free to expand axially in response to changes in temperature that may occur in service use.

By virtue of the external tapering of the bushing at its rigid but adjustable attachment to the quill through the screw 28 and the spacer 30, any clearances that may develop by wear in service use may be taken up easily. To permit this, the bushing is slotted internally as indicated at 34, there being one such groove disposed between the side edges of the ribs 25 and extending the full length of the bushing as shown in FIG. 3. Similar slots 35 are cut through the flange 29, there being two such slots disposed on opposite sides of each of the grooves 34. The width of the spacer 30 is such as to allow the tapered bushing to fit snugly in its seat 21 when the clamping screws 29 are tightened.

To take up any wear that may occur around the interior of the bushing, it is only necessary to remove the bushing and the spacer 30 and grind the latter down to allow further advance of the bushing into its seat. Then, as the screws 29 are again tightened, the bushing is collapsed radially as permitted by slight closing of the slots 34.

As an incident to inserting and clamping the bushing in its seat, suitable O type seal rings are compressed into grooves 21ª around the interior of the seat 21. These seals are disposed beyond opposite ends of the longitudinal rows of the recesses 22 so that the surface of the quill which overlaps all of the recesses forms a fluid tight rigid covering capable of withstanding hydraulic pressures of a magnitude sufficient to flex the thin sections 23 and press them against the spindle so as to develop the friction force required for locking the spindle in the quill.

The hydraulic pressure for actuating the clamp may be derived from a stationary source (not shown) and delivered through a duct 36 in the quill communicating with each of the recesses 22 through branch passages 37 and grooves 37ª encircling the recesses 22. As set forth more fully in the aforesaid application, a pipe 38 is extended into the casing 12 and delivers fluid from the source to a chamber 39 in which the ends of pistons 40 are exposed. The opposite ends of the pistons bear against the outer race 41 of a thrust bearing 42 having an inner race ring 43 splined onto the quill 13 and bearing against pistons 44 whose opposite ends are exposed within a chamber 45 communicating with the duct 36.

With this arrangement, hydraulic pressure admitted to the chamber 39 is thus transmitted mechanically and converted into hydraulic pressure in the recesses 22 on the rotary quill. As a result, the thin areas 23 of the bushing 18 are flexed inwardly and the pressure is thereby exerted on corresponding areas of the spindle. The latter is thus locked against axial displacement so long as the pressure continues to be applied through the pipe 38.

As an incident to flexing of the sections 23, the intervening thickened sections or ribs 25 are subjected to bending stresses. To avoid concentration of these stresses at the junctions 24, the ribs are slotted longitudinally as indicated at 47 along their inner faces. Herein, there are two such slots disposed side by side and having a depth somewhat more than half the radial thickness of the ribs and a width about one third that of the ribs. The radial rigidity of the ribs is thus preserved while permitting enough lateral flexure of the ribs to avoid objectionable concentration of the stresses at the edges of the ribs.

It will be apparent from the foregoing that the angular spacing of the weakened areas 23 and the separation of the adjacent areas by the thickened and therefore rigid ribs 25 makes it possible to employ a squeeze clamp of the above character for gripping and holding a rigid cylindrical surface which is interrupted around its periphery as by the keyways 19. That is to say, the ribs 25 are made wide and long enough to overlap and cover these depressions in the clamped cylinder and thereby, because of their rigidity, prevent any part of the bushing from being bent into the depressions under the heavy pressure which it is desirable to use in order to achieve the friction required for holding an element such as the cutter spindle in fixed axial position during service use.

In addition to permitting the hydraulically actuated squeeze clamp to be used in gripping a cylindrical element having an interrupted surface, the present invention contemplates arrangement of the weakened areas 23 and the ribs 25 in a novel manner to insure substantial radial balancing of the clamping forces and accurate centering of the clamped element on the axis of its supporting element. Generally stated, this is accomplished by so sizing the areas 23 and the ribs 25 and so arranging the same as to equalize the two pressures exerted on the spindle on opposite sides of a diameter, for example 46, through the circumferential center of any one of the ribs 25. In this instance, there are four ribs 25 of equal circumferential width and centered on perpendicular diameters 46 and 46ª. Also, the intervening recesses 22 are of equal arcuate width so that for any diameter through the center of one of the ribs, the clamping pressures applied to the spindle on opposite sides of such diameter will be equal and opposite. As a result of such balancing of the forces, the clamping pressures are utilized not only to hold the spindle against axial displacement but also to take up radial clearance around the latter and hold the spindle centered on the axis of the quill.

In the embodiment above described, it will be noted that the ribs 25 may be made relatively narrow because of the correspondingly narrow width of the keyways 19. For other applications, a wider rib may be required in order to cover the necessary interruption or groove in the surface of the clamped element. Such a modification is shown in FIGS. 5 and 6 in which the improved squeeze clamp including a bushing 50 of the character above described is used to clamp a quill 51 in different positions of axial adjustment in a stationary housing 52 in which the quill is supported in the bushing and a bearing 53 for axial sliding to change the position of the cutter bolted to the flanged outer end of a spindle 54. The latter extends through and is journaled in the quill 51 and is held by a suitable thrust bearing 54ª against axial displacement relative to the quill. Axial adjustment of the cutter spindle is effected in this instance by turning a worm 55 mounted on the housing 52 and meshing with arcuate rack teeth 56 cut along one side of the quill leaving arcuate depressions 57 between the teeth.

As before, the bushing 50 has an internal cylindrical surface closely fitting around the quill and tapered externally to fit in a seat 58 of complemental taper defined by the inner wall of a ring 58ª which, together with the bushing and a spacer 58ᵇ, are locked securely in counter bores in the housing 52 by screws 59 extending through an external flange 60 at the outer end of the bushing. O rings 61 are disposed in grooves 62 around opposite end portions of the bushing and compressed between the bottoms of these grooves and the seat 58.

Between the seals 61 are a plurality, four in the present instance, of outwardly opening recesses 63 whose thin and weakened bottoms 64 provide areas of equal sizes which are flexed inwardly to grip the spindle when fluid at the proper pressure is admitted to the recesses through a groove 65 leading from a supply duct 66 in the housing 52.

The weakened areas 64 are separated by two pairs of ribs 66 and 67 which extend longitudinally of the bushing and define the side walls 71 of the recesses 63. In this instance, the ribs of the different pairs are of different circumferential widths and centered on the perpendicular diameters 68 and 69 with the ribs of each pair disposed diametrically opposite each other. Like the ribs 25 above described, the ribs 66 are of relatively narrow width, while the ribs 67 are of equal width but substantially wider sufficiently so to overlap and cover the tooth depressions 57 in the quill surface. As before, shallow grooves 70 are formed along the center lines of the ribs 66 and 67 to avoid objectionable concentration of the bending forces adjacent the sides 71 of the recesses 63 when pressure fluid is admitted to the recesses. In spite of the difference in width between the ribs 66 and 67, it will be observed that the clamping pressures applied to the spindle on opposite sides of either of the diameters 68 and 69, are equally balanced so as to hold the quill centered within its mounting.

It will be apparent that other arrangements of the weakened areas and the intervening rigid ribs may be employed while achieving the desired balancing of the clamping forces and accurate centering of the clamped spindle or quill. Thus, where there is only one keyway or interruption in the cylindrical surface of the clamped element, an odd number of recesses may be employed provided that these are of equal arcuate widths and distributed uniformly around the cylinder to be clamped and separated by intervening ribs also of equal arcuate widths. With such an arrangement, it will be apparent as before that the distribution of the clamping forces applied to the clamped element by the pressures in the thin sections will be distributed uniformly around the axis of the element. That is to say, the opposed clamping forces exerted on opposite sides of any of the diameters through the center of any one rib will be balanced and the clamped element will thus be centered accurately relative to the axis of its mounting.

Also, it will be apparent that when the surface to be gripped by the improved squeeze clamp is continuous and uninterrupted by depressions, the ribs between the adjacent recesses and weakened sections of the bushing may be omitted, the weakened section then being a continuous sleeve. In such a case, the bushing is formed as a spool of the cross-section shown in FIG. 5 with the spool heads sealed by the rings 61 and defining the walls of a continuous peripheral groove whose weakened bottom is flexed inwardly under the hydraulic pressure. In this way, a uniform gripping pressure is exerted around the entire circumference of the cylinder to be clamped.

I claim as my invention:

1. The combination of, a tubular member having an internal surface of cylindrical contour, a second member extending through said tubular member and having a cylindrical external surface telescoping with said first surface with a close sliding fit, means supporting said members for relative axial sliding, the surface of one of said members being rigid, angularly spaced arcuate recesses formed in the side of said other member opposite said rigid surface whereby to render the wall of the member at the bottoms of said recesses thin and radially flexible, the intervening arcuate areas of said other member being thick and rigid, a rigid wall covering each of said recesses to constitute the latter a fluid tight pressure chamber, and means for delivering fluid to said chamber under a pressure sufficient to flex said thin walled areas and clamp said surfaces together, the areas of said thin bottoms of said recesses on opposite sides of any diametrical plane through the circumferential center of one of said rigid areas, being substantially equal whereby to equalize the clamping forces exerted on said rigid member and maintain the latter centered in the other member.

2. The combination of, a tubular member having an internal surface of uniform size along its length and of predetermined cross-sectional contour, a second member extending through said tubular member and having an external surface complementing the contour of and telescoping with said first surface with a close sliding fit, means supporting said members for relative axial sliding, the surface of one of said members being rigid, a plurality of angularly spaced arcuate recesses formed in the side of said other member opposite said rigid surface whereby to render the wall of the member at the bottoms of said recesses thin and radially flexible, the intervening arcuate areas of said other member being thick and constituting rigid ribs, a rigid wall covering said ribs and each of said recesses to constitute the latter a fluid tight pressure chamber, and means for delivering fluid to said chamber under a pressure sufficient to flex said thin walled areas and clamp said surfaces together, the areas of said thin bottoms of said recesses on opposite sides of any diameter through the circumferential center of one of said ribs being substantially equal whereby to equalize the clamping forces exerted on said rigid surfaced member and maintain the latter centered in said other member.

3. The combination as defined in claim 2 in which said rigid surface is formed with a longitudinal slot extending along one of said rigid ribs, such rib having an arcuate width greater than said slot so as to cover the latter completely.

4. The combination of, a tubular bushing having an internal cylindrical surface, a rigid cylinder extending through said bushing and having an external surface telescoping with said first surface with a close sliding fit, angularly spaced arcuate recesses formed in the outer side of said bushing whereby to render the wall of the bushing at the bottoms of said recesses thin and radially flexible, the intervening arcuate areas of said bushing being thick and constituting rigid external ribs, a housing supporting said bushing and having a rigid surface enclosing said ribs and each of said recesses to constitute the latter a sealed and fluid tight pressure chamber, and means for delivering fluid to said chamber under a pressure sufficient to flex said thin walled areas inwardly and clamp the same against said member under forces which are substantially equal and opposite on opposite sides of any diametrical plane through the circumferential center of any one of said ribs.

5. The combination as defined by claim 4 in which the ribs on diametrically opposite sides of said bushing are of equal circumferential width and centered on a single diameter.

6. The combination as defined by claim 3 including inwardly opening slots formed in said ribs between adjacent ones of said recesses and extending longitudinally of the ribs.

7. The combination of, a tubular bushing having an internal cylindrical surface and a tapered external surface, a rigid cylinder extending through said bushing and having an external surface telescoping with said first surface with a close sliding fit, angularly spaced arcuate recesses formed in the outer side of said bushing whereby to render the wall of the bushing at the bottoms of said recesses thin and radially flexible, the intervening arcuate areas of said bushing being thick and constituting rigid external ribs, a housing supporting said bushing and having a rigid surface enclosing said ribs, tapered surface, and each of said recesses to constitute the latter a sealed and fluid tight pressure chamber, means securing said bushing to said housing while permitting endwise adjustment to take up wear, an internal groove narrower than said ribs formed in and extending along the internal surface of certain of the ribs throughout the length of said bushing, and means for delivering fluid to said chamber under a pressure sufficient to flex said thin walled areas inwardly and clamp the same against said member under forces which are substantially equal and opposite on opposite sides of any diametrical plane through the circumferential center of any one of said ribs.

8. The combination of, a housing having a recess therein defined by a rigid frusto-conical internal surface, a tubular spool-like bushing disposed in said recess having an internal cylindrical surface and a tapered external surface complementing and seated in said conical surface, radially opening grooves in one of said surfaces around opposite ends of said bushing, seal rings seated in said grooves and compressed against the opposite one of said surfaces, means securing one end of said bushing rigidly to said housing, the other end of the bushing being free for axial displacement, a rigid cylinder extending through said bushing and telescoping with said cylindrical surface with a close sliding fit, the exterior of said bushing between said seal rings being recesses to provide a plurality of thin bottom sections adapted to flex inwardly under fluid pressure and grip said cylinder under clamping pressures which are equalized on opposite sides of a diametrical plane whereby to clamp the cylinder against axial displacement while holding the cylinder centered relative to said tapered surface, and means for delivering pressure fluid into the sealed chamber between said tapered surface and said thin sections.

9. The combination of, a housing having a recess therein defined by a rigid frusto-conical internal surface, a tubular spool-like bushing disposed in said recess having an internal cylindrical surface and a tapered external surface complementing and seated in said conical surface, radially opening grooves in one of said surfaces around opposite ends of said bushing, seal rings seated in said grooves and compressed against the opposite one of said surfaces, means securing one end of said bushing rigidly to said housing, a rigid cylinder extending through said bushing and telescoping with said cylindrical surface with a close sliding fit, the exterior of said bushing between said seal rings being recesses to provide a plurality of thin bottom sections adapted to flex inwardly under fluid pressure and grip said cylinder under clamping pressures which are equalized on opposite sides of a diametrical plane whereby to clamp the cylinder against axial displacement while holding the cylinder centered relative to said tapered surface, and means for delivering pressure fluid into the sealed chamber between said tapered surface and said thin sections.

10. The combination of, a housing having a recess therein defined by a rigid internal surface, a tubular spool-like bushing disposed in said recess having an internal cylindrical surface and an external surface complementing and seated in said internal surface, radially opening grooves in one of said surfaces around opposite ends of said bushing, seal rings seated in said grooves and compressed against the opposite one of said surfaces, means securing said bushing rigidly to said housing, a rigid cylinder extending through said bushing and telescoping with said cylindrical surface with a close sliding fit, the exterior of said bushing between said seal rings being recesses to provide a plurality of thin bottom sections adapted to flex inwardly under fluid pressure and grip said cylinder under clamping pressures which are equalized on opposite sides of a diametrical plane whereby to clamp the cylinder against axial displacement while holding the cylinder centered relative to said internal surface, and means for delivering pressure fluid into the sealed chamber between said internal surface and said thin sections.

References Cited in the file of this patent

UNITED STATES PATENTS

| | | |
|---|---|---|
| 2,674,461 | Gamet | Apr. 6, 1954 |
| 2,788,979 | Skillin | Apr. 16, 1957 |
| 2,933,986 | Schroeder | Apr. 26, 1960 |
| 2,957,393 | Kampmeier | Oct. 25, 1960 |